(12) United States Patent
Wallis et al.

(10) Patent No.: US 7,766,183 B2
(45) Date of Patent: Aug. 3, 2010

(54) PEELABLE LID STRUCTURE

(75) Inventors: Andrew John Wallis, Wantage (GB);
Alastair Wilson, Wantage (GB)

(73) Assignee: Crown Packaging Technology, Inc.,
Alsip, IL (US)

( * ) Notice: Subject to any disclaimer, the term of this patent is extended or adjusted under 35 U.S.C. 154(b) by 1230 days.

(21) Appl. No.: 10/521,785

(22) PCT Filed: Jun. 30, 2003

(86) PCT No.: PCT/EP03/06929

§ 371 (c)(1),
(2), (4) Date: Jan. 21, 2005

(87) PCT Pub. No.: WO2004/014758

PCT Pub. Date: Feb. 19, 2004

(65) Prior Publication Data

US 2005/0247712 A1    Nov. 10, 2005

(30) Foreign Application Priority Data

Jul. 26, 2002  (EP)  ................... 02255210

(51) Int. Cl.
*B65D 17/34*  (2006.01)
*B65D 51/00*  (2006.01)

(52) U.S. Cl. .................. 220/359.2; 215/232
(58) Field of Classification Search ............ 220/359.2, 220/359.3, 359.4, 359.1, 260, FOR. 186; 215/232, 261, 305, 295, 200
See application file for complete search history.

(56) References Cited

U.S. PATENT DOCUMENTS

| | | | | |
|---|---|---|---|---|
| 2,767,754 A | * | 10/1956 | Lederer et. al. ............. 220/789 |
| 2,937,481 A | * | 5/1960 | Palmer .................. 53/471 |
| 3,182,852 A | * | 5/1965 | Wilkinson ............... 220/270 |
| 3,236,409 A | * | 2/1966 | Cross et al. ............. 220/260 |
| 3,366,309 A | * | 1/1968 | Scharre ................ 229/125.14 |
| 3,892,351 A | * | 7/1975 | Johnson et al. ............ 206/508 |
| 4,013,188 A | * | 3/1977 | Ray ...................... 215/347 |

(Continued)

FOREIGN PATENT DOCUMENTS

DE    34 47 875 A1    7/1986

(Continued)

OTHER PUBLICATIONS

Translation of FR 2577897 A1 (Gerard et al.), Aug. 29, 1986, Figs. 2 and 3, p. 3 Lines 22-35.*

(Continued)

*Primary Examiner*—Anthony Stashick
*Assistant Examiner*—Robert J Hicks
(74) *Attorney, Agent, or Firm*—Miles & Stockbridge P.C.; David R. Schaffer, Esq.

(57) ABSTRACT

A peelable lid structure, particularly for use in the closing of food cans, has a tab which is folded over the center panel and secured in the folded position for processing of can contents and/or handling operations. As the tab is secured, an inexpensive laminate structure which requires little or no aluminum content can be used. Methods of forming the peelable lid structure include exposing a layer of heat sealable material and/or an adhesive layer so that the tab (3) can be folded over and adhered to this layer, for example, by heat sealing.

18 Claims, 4 Drawing Sheets

U.S. PATENT DOCUMENTS

| | | | |
|---|---|---|---|
| 4,163,506 A * | 8/1979 | Patterson | 220/260 |
| 4,227,624 A * | 10/1980 | Hawkins | 220/265 |
| 4,445,620 A * | 5/1984 | Brochman et al. | 220/271 |
| 4,629,112 A | 12/1986 | Stenzel | |
| 4,757,914 A * | 7/1988 | Roth et al. | 220/359.2 |
| 4,775,076 A * | 10/1988 | Horvath | 220/359.3 |
| 4,834,259 A * | 5/1989 | Kubis et al. | 220/359.2 |
| 4,934,544 A * | 6/1990 | Han et al. | 215/232 |
| 5,119,964 A * | 6/1992 | Witt | 215/251 |
| 5,125,529 A * | 6/1992 | Torterotot | 220/270 |
| 5,197,618 A * | 3/1993 | Goth | 215/232 |
| 5,407,751 A * | 4/1995 | Genske et al. | 428/516 |
| 5,433,992 A * | 7/1995 | Galda et al. | 428/201 |
| 5,626,929 A * | 5/1997 | Stevenson | 428/35.8 |
| 5,772,060 A * | 6/1998 | Kaneko et al. | 220/257.2 |
| 5,887,738 A * | 3/1999 | Bietzer et al. | 215/232 |
| 5,992,674 A | 11/1999 | Schulz | |
| 6,193,094 B1 | 2/2001 | Diamond et al. | |
| 6,277,478 B1 * | 8/2001 | Kurita et al. | 428/200 |
| 6,497,336 B2 * | 12/2002 | Grayer | 220/359.2 |
| 6,974,045 B1 * | 12/2005 | Trombach et al. | 215/232 |
| 2005/0045633 A1 * | 3/2005 | Roeterdink et al. | 220/254.1 |

FOREIGN PATENT DOCUMENTS

| | | |
|---|---|---|
| EP | 0 286 407 A | 10/1988 |
| FR | 2 577 897 A1 | 8/1986 |
| JP | 03212377 A * | 9/1991 |

OTHER PUBLICATIONS

International Application No. PCT/EP03/06929—International Search Report mailed Oct. 16, 2003.

* cited by examiner

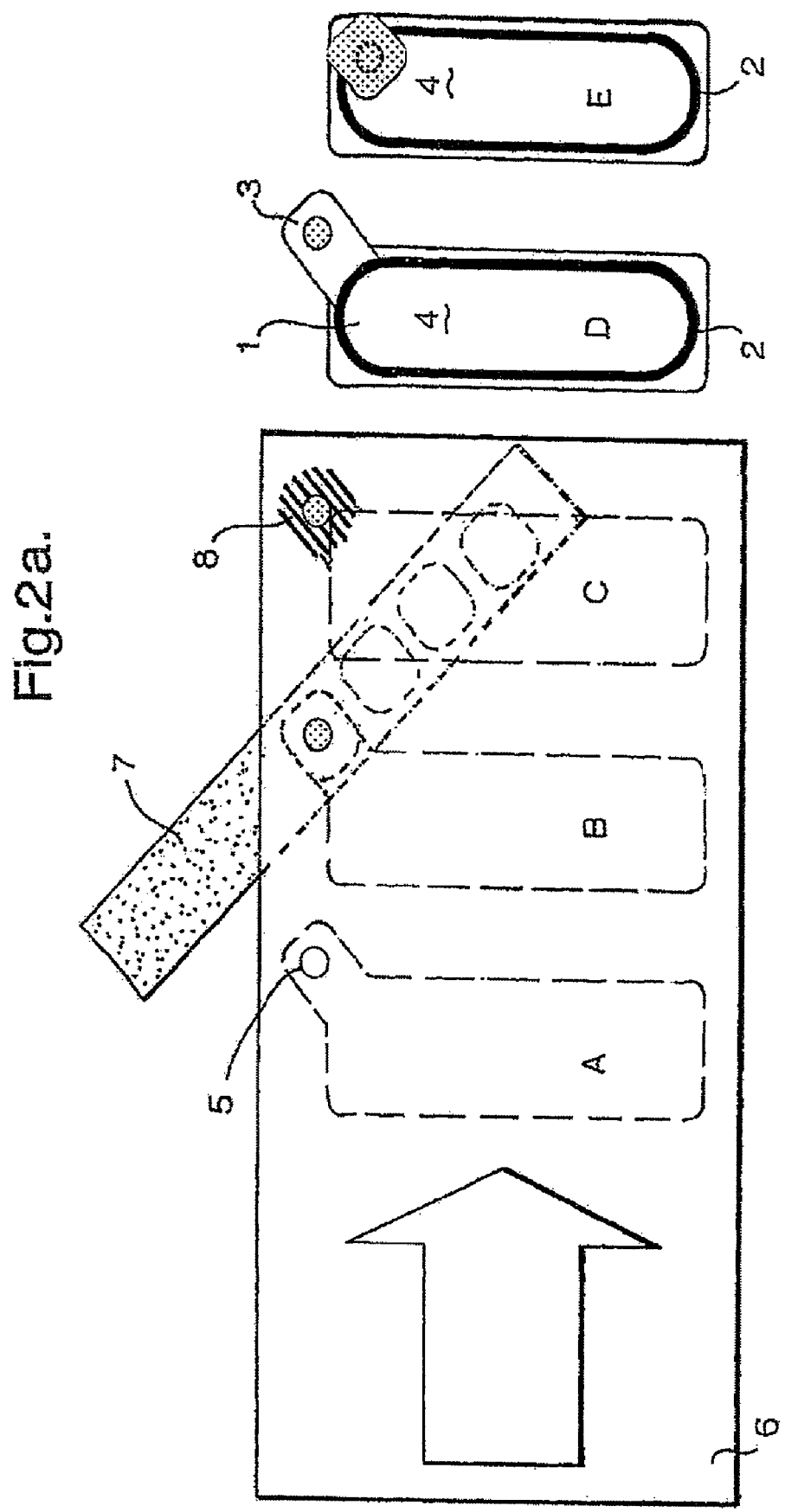

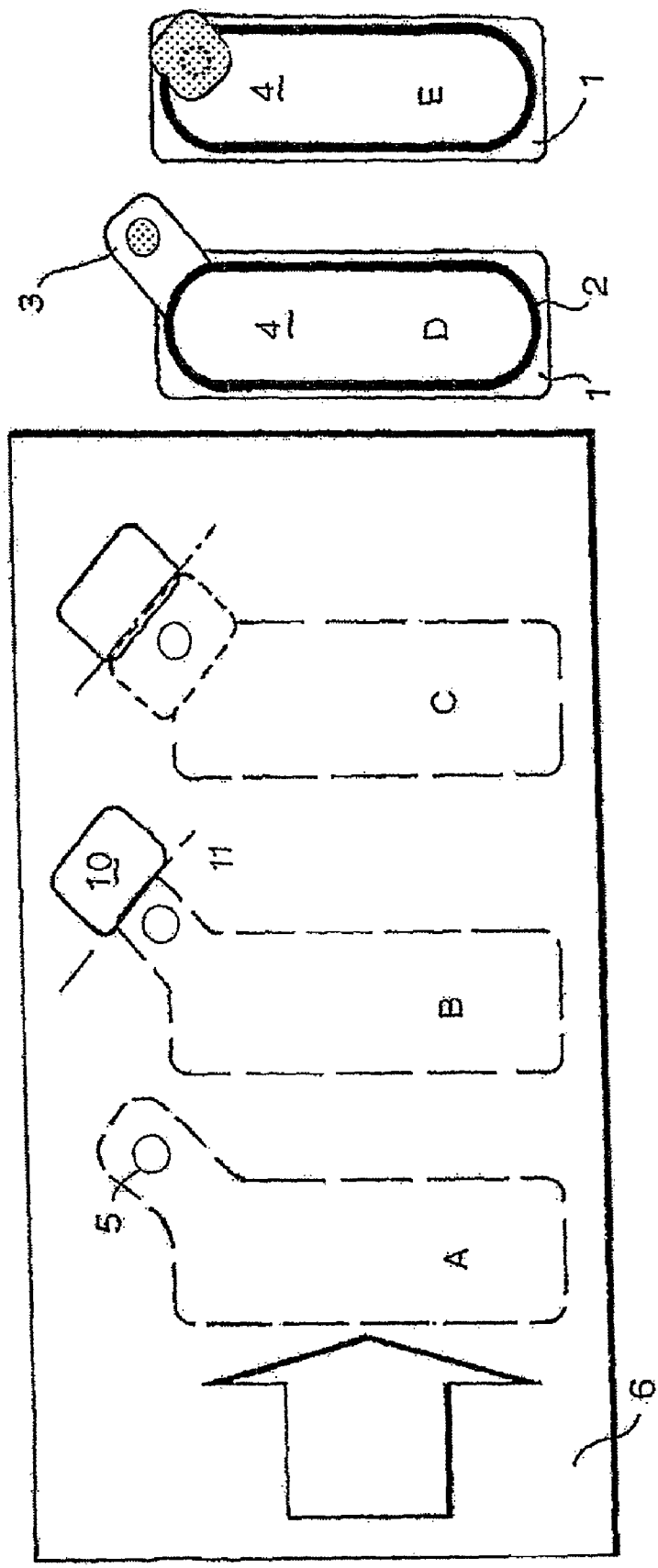

PEELABLE LID STRUCTURE

BACKGROUND OF THE INVENTION

This invention relates to a peelable lid structure and, in particular, to a method of making a peelable lid structure for use in the closing of food cans, for example.

Easy open ends using a ring pull tab for removal of a centre panel by tearing a score, are well established for use in the closing of cans, in particular those cans used for the packaging of pet food, soup and other food products. However, as food products typically require processing to comply with food safety standards, this type of easy open end is relatively thick in comparison with the side wall of the can, in order to withstand the temperatures and pressures inherent in the process.

Alternative closures which comprise a foil-type peelable lid structure which is adhered to a metal ring which is, in turn, seamed to the edge of the can body, have also been proposed. The peelable lid structure typically comprises a laminate structure of polypropylene, aluminium and varnish. The polypropylene layer is used for bonding to the metal ring. A tab which extends laterally from a centre panel of the peelable lid structure can be folded over the centre panel during retorting, or during handling operations such as seaming.

The aluminium layer performs as a barrier material and is generally about 60 to 70 microns thick. The thickness of this aluminium layer is not only dictated by the barrier requirements but also by the need to provide a "deadfold" to retain its folded position and prevent curling during sterilisation, This curling occurs at retort temperatures, which are typically 120° C. to 132° C. for processing products such as fish, pet foods or soup, due to differential shrinkage in layers which form the structure. The thick layer of aluminium thus retains the tab folded flat over the centre panel in particular during processing and seaming.

Both of the above types of peelable lid structure are costly to manufacture, in particular due to the high costs of metal used.

SUMMARY OF THE INVENTION

According to the present invention, there is provided a peelable lid structure for a container, the peelable lid structure including: a barrier layer for preventing the passage of fluids; and a tab extending from a centre panel of the peelable lid structure for removing the peelable lid structure from the container to allow access to the container contents; in which the barrier layer includes less than 20 microns thickness of aluminium; and in which the tab is folded over the centre panel and secured in the folded position on the centre panel for processing of can contents and/or handling operations.

The peelable lid structure is particularly suitable for processed food applications. Material used for the peelable lid structure is flexible and has little "deadfold" (it cannot retain its folded position) due to the low thickness (or absence) of the aluminium layer. However, by securing the tab in the folded position, the fold is retained independently of the structure, specifically its aluminium content. Curling during processes such as sterilisation is therefore avoided.

As the structure is flat and the tab is secured to the centre panel, obstruction of tooling during processes such as seaming is avoided. Usually, the structure is fixed to a "ring" which is then seamed to a container body. Securing the tab prevents disturbance of such a double seam.

Although the tab is secured to the centre panel, it is essential to have an unbonded part of the tab for finger access when opening. Ideally, the unbonded part may provide tolerance for poor alignment on folding the tab and may also control the fold line position on the tab. The bonded part or parts of the tab are preferably close to the edges and/or corners of the peelable lid structure so as to avoid curl back during processing or handling, for example.

The finger access may be provided without allowing the tab to curl and numerous arrangements may be used within these constraints of access without curl. Heat sealing and/or adhesive may be applied, for example, as spots or patches on the film and may form lines in the shape of numerals, letters, patterns or logos as part of the heat sealing (or other adhering) operation. A number may give information such as the bonding station reference for quality assurance purposes.

Preferably, the aluminium layer is not more than 15 microns in thickness. The peelable lid structure may include one or more of the following layers: polyethylene terephthalate (PET), aluminium, nylon and/or polypropylene. Thus, typically, the peelable lid structure is a laminate. These together form a structure which is significantly lower in cost than currently available peelable closures.

Where a nylon layer is used, the barrier properties (impermeability to oxygen) prevent corrosion of the aluminium layer by contents of the container and may even allow the structure to be used without any aluminium layer at all, with consequent cost savings. PET provides strength to the structure, and polypropylene is a heat sealable layer which may be used for securing the tab in its folded position.

Ideally, the tab may be secured in the folded position by an adhesive or by heat sealing. Application of a heat sealable adhesive may be by gravure printing. The tab or centre panel may usually include a patch, an area of which is exposed by a hole in the tab or centre panel respectively, and the tab may then be secured in the folded position by the adhesive or heat sealing to the exposed area of patch. This patch may be a discrete piece of material, for example polypropylene for heat sealing, or it may be an outer part of the tab which is folded over a hole on an inner part of the tab and secured by application of heat and, optionally, pressure.

According to another aspect of the present invention, there is provided a method of forming a peelable lid structure having a centre panel and a tab extending from the centre panel, the method comprising: forming a hole in a portion of a lidding material corresponding to the centre panel of the peelable lid structure; covering the hole by fixing a patch to a first side of the lidding material, thereby forming an area of patch exposed by the hole on the opposite side of the lidding material; cutting the peelable lid structure out of the lidding material; folding the tab portion of the peelable lid structure over the centre panel, thereby covering the exposed area; and securing the tab to the centre panel by heat sealing or bonding of the exposed region.

This inventive concept of heat sealing and/or bonding the tab to the centre panel in order to secure the tab in place for processing, seaming etc. can be achieved by alternative methods. Thus in one alternative aspect of the present invention there is provided a method of forming a peelable lid structure having a centre panel and a tab extending from the centre panel, the method comprising: forming a hole in a portion of a lidding material corresponding to the tab of the peelable lid structure; covering the hole by fixing a patch to a first side of the lidding material, thereby forming an area of patch exposed by the hole on the opposite side of the lidding material; cutting the peelable lid structure out of the lidding material; folding the tab portion of the peelable lid structure over the centre panel, so that the exposed region is covered by the centre panel; and securing the tab to the centre panel by heat sealing and/or bonding of the exposed area.

In a preferred embodiment, the hole may be formed in an inner part of the tab and the patch may then comprise an outer part of the tab portion of the peelable lid structure. The method ideally further comprises folding this outer part of the tab over an inner part of the tab, thereby covering the hole and forming the exposed area. As a result, extra rigidity in the form of a double thickness of tab material is provided to the tab prior to securing the tab to the centre panel.

Alternatively, the method may comprise folding an outer part of the tab over an inner part of the tab so that the patch is disposed between the outer and inner parts of the tab; and fixing the outer part of the tab to the inner part. This provides not just a double thickness of tab material but the layer of patch material between the tab layers.

Each method typically forms a peelable lid structure which includes a barrier layer using less than 20 microns of aluminium, preferably not more than 15 microns in thickness of aluminium. The peelable lid structure may include one or more of the following layers: polyethylene terephthalate (PET), aluminium, nylon and/or polypropylene. A varnish, further PET layer, or other coating may also be used which avoids any requirement for PET to bond to polypropylene (which is not possible if these are in their "pure" form). The choice of these layers may mean that a barrier layer can be provided without any aluminium at all as discussed above.

Preferred embodiments of the invention will now be described, by way of example only, with reference to the drawings, in which:

BRIEF DESCRIPTION OF THE DRAWINGS

FIG. 3 is a schematic view of an alternative method of forming a peelable lid structure.

DETAILED DESCRIPTION OF THE PREFERRED EMBODIMENTS

Figure 1:
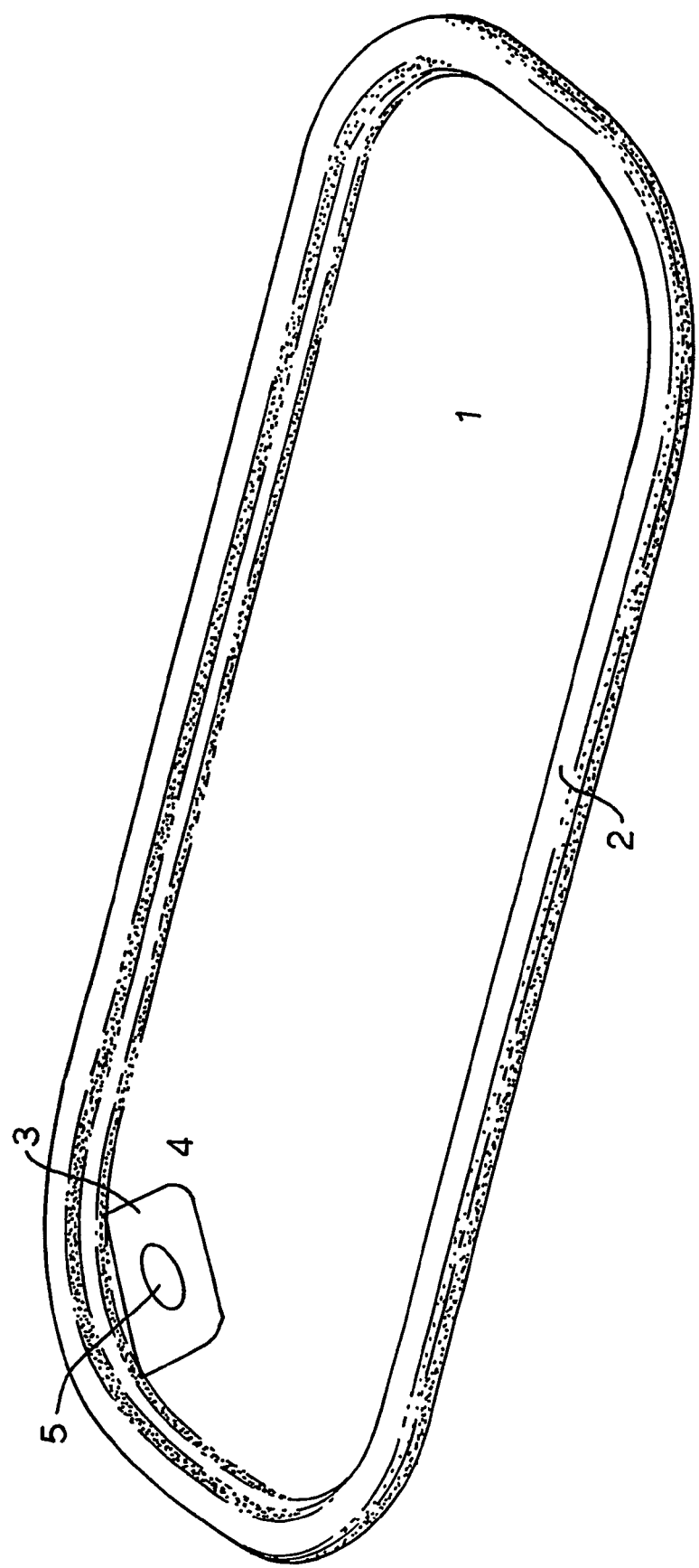
FIG. 1 is a perspective view of a peelable lid structure.

FIG. 1 shows a basic flexible peelable lid structure 1 which has been fixed to a "ring" 2 for double seaming onto a container (not shown). The closure formed by the peelable lid structure and ring are typically intended for use in the packaging of fish, pet foods etc where an easy open end is desirable. Such products require processing in a retort at temperatures of typically 120° C. to 132° C. and this, together with the requirement of double seaming ring 2 to the container, make securing of the tab imperative. Prior to the present invention, it has always been thought necessary to have a relatively thick layer of aluminium in the peelable lid structure in order that the tab 3 be held against centre panel 4 by the dead fold of the aluminium layer.

In the structure 1 of FIG. 1, adhesive between the tab 3 and centre panel 4 of the peelable lid structure 1, secures the tab through a hole 5 in the lidding. Different ways of achieving this bond will become apparent from the description of FIGS. 2 and 3 which follow.

Figure 2B:
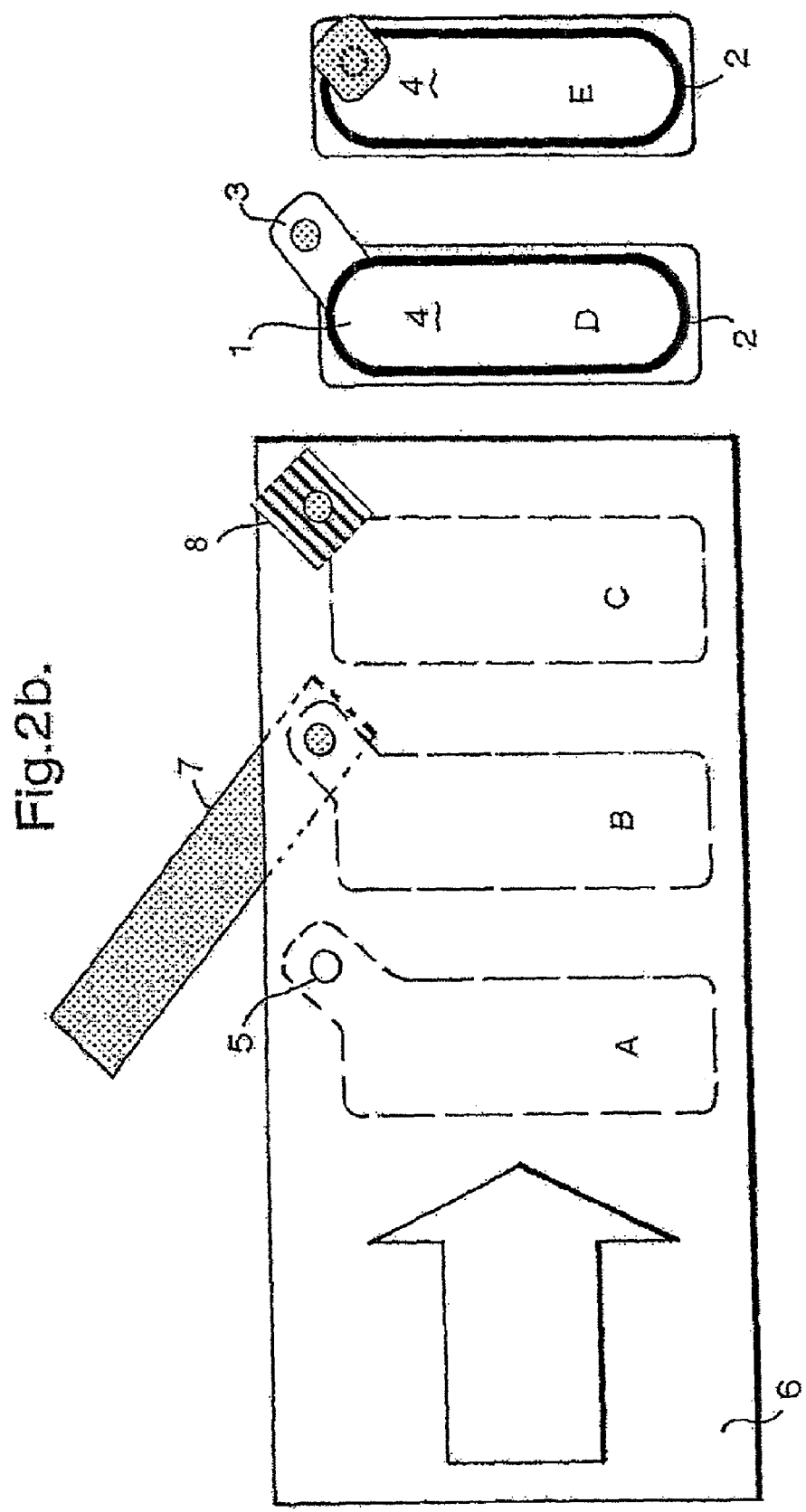
FIG. 2 is a schematic view of a method of forming a peelable lid structure.

FIGS. 2a and 2b are different aspects of the same method which index a lidding material 6 from left to right as shown in the drawings and a strip of patch material 7 at an angle to the path of the lidding material.

As a first step A in the process, a hole 5 is formed in the lidding material 6 at a position which corresponds to a tab of the final peelable lid structure. A self-adhesive patch 8 which ideally includes a reinforced backing surface, is either punched out (FIG. 2a) or cut off (FIG. 2b) from the strip of patch material 7 and stuck to the tab position (B and C). The patch 8 is usually slightly larger than the size which the final tab of the peelable lid structure will be.

The lidding material with patch 8 is fed into a lid cutter and cut in conventional manner (step D) and sealed to a ring 2 to form the structure 1. Finally, the tab 3 is folded and stuck by adhesive on the patch 8 which is exposed by the hole 5. The final peelable lid structure is shown generally at position E.

Although this embodiment is described as using adhesive to secure the tab, it is clearly possible to secure the tab by heat sealing if a heat sealable layer such as polypropylene is provided on the lidding material and patch material. The important feature is that curling of the tab during thermal processing is prevented This method requires no difficult folding and makes good use of material.

In the embodiment of FIG. 3, a lidding material 6 is indexed from left to right and a hole 5 punched in the centre of the future tab (step A) in a similar manner to that shown in FIG. 2. This embodiment, however, does not require a separate strip of patch material. Instead, an outer part of the tab is used as a patch.

A U-shape is lanced or cut in a position corresponding to an outer part 10 of the tab, from the lidding material (step B) and the cut material folded down to around 90 degrees. Motion of the lidding index feed continues the folding process until the outer part is completely folded over an inner part 11 of the tab.

If the lidding material includes a heat sealable layer, this can be used for bonding purposes. Alternatively, a small drop of glue can be applied to the underside of the lidding material, particularly if this can be fed through the machine without touching machine components. The adhesive can be applied by various methods such as gravure printing. The use of hot melt adhesive means that the glue can be reactivated by reheating using a contact plate, by ultraviolet radiation or by induction heating for example. The tab may be secured either prior to, during or after heat sealing to the ring. The heat seal may be used to reactivate adhesive if the lidding material includes a conductive layer. Finally, a combination of the patch process of FIG. 2 and the tab folding of FIG. 3 can be used if extra rigidity of the tab is desirable. In the last case, patch material would be indexed and adhered to the underside of the tab.

The lidding material is fed into a lid cutter and cut in conventional manner (step D) and sealed to a ring 2 to form the structure 1. Finally, the tab 3 is folded and stuck through the hole 5 by a heat seal layer of the lidding material. Alternatively, the tab is secured by a hot melt adhesive. The final peelable lid structure is shown generally at position E.

Although these methods and structures have all been described with reference to a hole 5 which is formed in the tab position, it is clearly possible for a hole to be formed in the centre panel and the tab secured in the same manner.

Although a preferred embodiment of the invention has been specifically illustrated and described herein, it is to be understood that minor variations may be made in the apparatus and method without departing from the spirit and scope of the invention, as defined by the appended claims.

What is claimed is:

1. A peelable lid structure for a container, the peelable lid structure including:
   a barrier layer for preventing the passage of fluids; and
   a tab extending from a centre panel of the peelable lid structure for removing the peelable lid structure from the container to allow access to the container contents;

in which the barrier layer includes less than 20 microns thickness of aluminum; and in which the tab is folded over the centre panel and secured in the folded position on the centre panel for processing of can contents or handling operations;

wherein the tab or centre panel includes a patch, an area of which is exposed by a hole in the tab or centre panel respectively, and the tab is secured in the folded position by bonding to the exposed area of the patch.

2. The peelable lid structure as defined in claim 1, wherein the aluminum layer is not more than 15 microns in thickness.

3. The peelable lid structure as defined in claim 1, wherein the peelable lid structure includes one or more of the following layers: polyethylene terephthalate (PET), aluminum, nylon or polypropylene.

4. The peelable lid structure as defined in claim 1, wherein the tab is secured in the folded position by an adhesive or by heat sealing.

5. The peelable lid structure as defined in claim 2, wherein the peelable lid structure includes one or more of the following layers: polyethylene terephthalate (PET), aluminum, nylon or polypropylene.

6. The peelable lid structure as defined in claim 1, wherein the patch includes a discrete piece of material, or an outer part of the tab which is folded over a hole on an inner part of the tab.

7. The peelable lid structure as defined in claim 1, wherein the hole is formed in the centre panel of the peelable lid structure, the hole covered by the patch being fixed to a first side of the centre panel to form an area of patch exposed by the hole on the opposite side of the centre panel, the tab covering the exposed area of patch when in the folded position, the tab secured in the folded position by bonding to the exposed area of the patch.

8. The peelable lid structure as defined in claim 1, wherein the hole is formed in the tab of the peelable lid structure, the hole covered by the patch being fixed to a first side of the tab to foam an area of patch exposed by the hole on the opposite side of the tab, the exposed area of patch being covered when the tab is in the folded position, the tab secured in the folded position by bonding to the exposed area of the patch.

9. A peelable lid structure for a container, the peelable lid structure including:

a barrier layer for preventing the passage of fluids; and a tab extending from a centre panel of the peelable lid structure for removing the peelable lid structure from the container to allow access to the container contents;

in which the barrier layer extends from the centre panel into the tab and includes less than 20 microns thickness of aluminum; and in which the tab is folded over the centre panel and secured in the folded position on the centre panel for processing of can contents or handling operations;

wherein the tab or centre panel includes a patch, an area of which is exposed by a hole in the tab or centre panel respectively, and the tab is secured in the folded position by an adhesive or by heat sealing to the exposed area of the patch.

10. The peelable lid structure as defined in claim 9, wherein the aluminum layer is not more than 15 microns in thickness.

11. The peelable lid structure as defined in claim 9, wherein the peelable lid structure includes one or more of the following layers: polyethylene terephthalate (PET), aluminum, nylon or polypropylene.

12. The peelable lid structure as defined in claim 9, wherein the patch includes a discrete piece of material, or an outer part of the tab which is folded over a hole on an inner part of the tab.

13. The peelable lid structure as defined in claim 9, wherein the hole is formed in the centre panel of the peelable lid structure, the hole covered by the patch being fixed to a first side of the centre panel to form an area of patch exposed by the hole on the opposite side of the centre panel, the tab covering the exposed area of patch when in the folded position, the tab secured in the folded position by bonding to the exposed area of the patch.

14. The peelable lid structure as defined in claim 9, wherein the hole is formed in the tab of the peelable lid structure, the hole covered by the patch being fixed to a first side of the tab to form an area of patch exposed by the hole on the opposite side of the tab, the exposed area of patch being covered when the tab is in the folded position, the tab secured in the folded position by bonding to the exposed area of the patch.

15. A peelable lid structure for a container, the peelable lid structure including:

a barrier layer for preventing the passage of fluids; and a tab extending from a centre panel of the peelable lid structure for removing the peelable lid structure from the container to allow access to the container contents;

in which the barrier layer extends from the centre panel into the tab and includes less than 20 microns thickness of aluminum; and in which the tab is folded over the centre panel and secured in the folded position on the centre panel for processing of can contents or handling operations;

wherein the tab or centre panel includes a patch, an area of which is exposed by a hole in the tab or centre panel respectively, and the tab is secured in the folded position by bonding to the exposed area of the patch.

16. The peelable lid structure as defined in claim 15, wherein the aluminum layer is not more than 15 microns in thickness.

17. The peelable lid structure as defined in claim 15, wherein the peelable lid structure includes one or more of the following layers: polyethylene terephthalate (PET), aluminum, nylon or polypropylene.

18. The peelable lid structure as defined in claim 15, wherein the tab is secured in the folded position by an adhesive or by heat sealing.

* * * * *